United States Patent
Amor et al.

(10) Patent No.: US 10,294,309 B2
(45) Date of Patent: May 21, 2019

(54) EXTRACTION OF POLYISOPRENE WITH HIGH MOLAR MASS

(71) Applicants: Association pour les Transferts de Technologies du Mans, Le Mans (FR); Centre de coopération internationale en recherche agronomique pour le développement (CIRAD), Paris (FR)

(72) Inventors: Ali Amor, Valenton (FR); Serge Palu, Pardaillan (FR); Daniel Auguste Marie Paul Pioch, Prades-le-Lez (FR); Michel Dorget, Le Mans (FR)

(73) Assignees: Association pour les Transferts de Technologies du Mans, Le Mans (FR); Centre de cooperation internationale en recherche afronomique pour le developpement (CIRAD), Paris (FR)

( * ) Notice: Subject to any disclaimer, the term of this patent is extended or adjusted under 35 U.S.C. 154(b) by 45 days.

(21) Appl. No.: 15/566,142

(22) PCT Filed: Apr. 14, 2016

(86) PCT No.: PCT/EP2016/058285
§ 371 (c)(1),
(2) Date: Oct. 12, 2017

(87) PCT Pub. No.: WO2016/166251
PCT Pub. Date: Oct. 20, 2016

(65) Prior Publication Data
US 2018/0086854 A1     Mar. 29, 2018

(30) Foreign Application Priority Data
Apr. 15, 2015   (FR) ...................................... 15 53343

(51) Int. Cl.
*C08C 2/02* (2006.01)
*C08C 4/00* (2006.01)
*C08H 8/00* (2010.01)
*B01D 11/02* (2006.01)

(52) U.S. Cl.
CPC ............ *C08C 2/02* (2013.01); *B01D 11/0238* (2013.01); *C08C 4/00* (2013.01); *C08H 8/00* (2013.01)

(58) Field of Classification Search
CPC .... C08C 4/00; C08C 2/02; C08H 8/00; B01D 11/0238
USPC ....................................................... 526/340.2
See application file for complete search history.

(56) References Cited

U.S. PATENT DOCUMENTS

| | | | | |
|---|---|---|---|---|
| 5,998,512 A | * | 12/1999 | Schloman | ................. C08C 1/04 524/17 |
| 2007/0276112 A1 | | 11/2007 | Buranov | |
| 2011/0240776 A1 | * | 10/2011 | Buranov | ................. B24B 19/22 241/101.01 |

FOREIGN PATENT DOCUMENTS

| | | | |
|---|---|---|---|
| WO | WO 2013/192182 A1 | 12/2013 | |
| WO | WO 2013/192217 A1 | 12/2013 | |

\* cited by examiner

*Primary Examiner* — William K Cheung
(74) *Attorney, Agent, or Firm* — Knobbe, Martnes, Olson & Bear LLP

(57) ABSTRACT

The invention relates to a method for extracting high-quality polyisoprene by grinding plants via rotary shearing using a device comprising at least one rotor and at least one stator, into particles of size smaller than 1 mm, or grinding at a pH higher than 3 and lower than 8. This method is implemented in aqueous phase and allows the preparation of a dispersion of polyisoprene in water having a weight average molecular weight ($M_w$) higher than 800 000 g/mol. The polyisoprene is extracted from plants and in particular from guayule (*Parthenium argentatum*). It is a method that is particularly heedful of the environment.

20 Claims, No Drawings

EXTRACTION OF POLYISOPRENE WITH HIGH MOLAR MASS

This application is a US national stage application filed under 35 USC § 371 of International Application No. PCT/EP2016/058285, filed Apr. 14, 2016; which claims priority to France App No. 15 53343, filed Apr. 15, 2015. The entire contents of the above-referenced patent applications are hereby expressly incorporated herein by reference.

FIELD OF THE INVENTION

The invention relates to a method for extracting high-quality polyisoprene by grinding plants, via rotary shearing using a device comprising at least one rotor and at least one stator, into particles of size smaller than 1 mm, or grinding at a pH higher than 3 and lower than 8. This method is implemented in aqueous phase and allows the preparation of a dispersion of polyisoprene in water having a weight-average molecular weight ($M_W$) higher than 800 000 g/mol. Polyisoprene is extracted from plants, in particular from guayule (*Parthenium argentatum*). It is a method that is particularly heedful of the environment.

BACKGROUND

Polyisoprene of natural origin is a material useful for the manufacture of items for which it is desired to take advantage of the material's mechanical properties.

In particular, polyisoprene derived from plants differing from the rubber tree (*Hevea*) is increasingly being sought after, particularly to overcome the allergy problems encountered by users of items manufactured from Hevea-derived polyisoprene.

Polyisoprene extracted from plants differing from *Hevea*, particularly from guayule, is of particular advantage for preparing gloves e.g. medical or surgical gloves, or for condom production. After coagulation of the guayule latex, the polyisoprene obtained can also be used to produce items in rubber, in particular to manufacture tyres.

Methods are known for extracting polyisoprene from plants. In general, these methods use organic solvents.

For health and environmental reasons, the use of organic solvents must be restricted or else avoided.

The production of polyisoprene via aqueous phase extraction is also particularly advantageous from an economical viewpoint.

Methods are known for extracting polyisoprene in aqueous phase. However, these known methods do not allow high-quality polyisoprene to be obtained, in particular polyisoprene have a weight-average molecular weight ($M_W$) possibly reaching 2 500 000 g/mol. Patent application US-2012/0063969 describes a method whereby guayule plants are milled under intense compression. The quality of the extracted polyisoprene may then be degraded. The amount of polyisoprene extracted from a given plant quantity and having satisfactory quality and weight-average molecular weight, ($M_W$) is then reduced In addition, known polyisoprene extraction methods do not always lead to obtaining polyisoprene in the form of a dispersion in water or in latex form.

Known aqueous phase extraction methods are generally implemented over particular pH ranges that are limited, generally strictly higher than 7 and in particular higher than 9, 10 or 11. Such pH values generally require the presence of a base substance which may lead to safety problems or which may lead to deterioration of the equipment used. Environmental pollution is also to be feared.

SUMMARY

There is therefore a need to make high-performance methods available for the extraction of high-quality polyisoprene. In particular, there is a need to provide methods for extracting polyisoprene from plants whereby the weight-average molecular weight ($M_W$) of the extracted polyisoprene is close to or the same as the weight-average molecular weight ($M_W$) of polyisoprene in the plant before extraction or in the natural state.

Yields of 50 or 70%, of 80 to 90% or of 100%, are of particular interest when extracting polyisoprene having a weight-average molecular weight ($M_W$) that is maintained close to or the same as the weight-average molecular weight ($M_W$) in the plant or in the natural state. The invention provides a method for extracting polyisoprene which allows a solution to be brought to all or part of the problems of polyisoprene extraction methods in the state of the art.

The invention therefore provides a method for extracting polyisoprene having a weight-average molecular weight ($M_W$) higher than 800 000 g/mol, in the form of a dispersion in water comprising:

grinding, via rotary shearing using a device comprising at least one rotor and at least one stator or grinding at a pH higher than 3 and lower than 8, at least one plant, plant part or plant derivative selected from among guayule (*Parthenium argentatum*), spurge (*Euphorbia lathyris*), argan (*Argania spinosa*), mariola (*Parthenium incanum*), rubber rabbitbrush (*Chrysothamnus pinifolius*), showy milkweed (*Asclepias speciosa*), pale Indian plantain (*Cacalia atripikifolia*), rubber vine (*Cryptostegia grandiflora*), Russian dandelion (*Taraxacum koksaghyz*), scorzonera (*Scorzonera* sp.), hoary mountain mint (*Pycnanthemum incanum*), Canada germander (*Teucrieum canadense*) and Tall Bellflower *Campanula americana* in a volume of water or in an aqueous solution ranging from 1 to 15 L/kg of plant, into particles of size less than 1 mm;

separating the solid residues.

With the method of the invention it is possible to extract polyisoprene whereby the extracted polyisoprene has a weight-average molecular weight ($M_W$) higher than 800 000 g/mol. Weight-average molecular weight ($M_W$) is measured by combining size exclusion chromatography (SEC) with the coupling of several detectors. Preferably, the method of the invention allows the extraction of polyisoprene whereby the extracted polyisoprene has a weight-average molecular weight ($M_W$) higher than 1 000 000 g/mol or higher than 2 000 000 g/mol or higher than 2 500 000 g/mol.

According to the invention, the extracted polyisoprene may have a weight-average molecular weight ($M_W$) ranging from 800 000 to 3 000 000 g/mol or from 800 000 to 2 500 000 g/mol or from 800 000 to 2 000 000 g/mol.

Particularly preferably, the extracted polyisoprene has a weight-average molecular weight ($M_W$) ranging from 1 000 000 to 3 000 000 g/mol or from 1 000 000 to 2 500 000 g/mol or from 1 000 000 to 2 000 000 g/mol.

Also particularly preferably, the extracted polyisoprene has a weight-average molecular weight ($M_W$) ranging from 1 500 000 to 3 000 000 g/mol or from 1 500 000 to 2 500 000 g/mol or from 2 000 000 to 2 500 000 g/mol or from 2 000 000 to 3 000 000 g/mol.

DETAILED DESCRIPTION

Also preferably, by means of the method of the invention, the weight-average molecular weight ($M_W$) of the extracted polyisoprene is 50 to 100% the value of the weight-average molecular weight ($M_W$) of the polyisoprene in the plant before extraction.

Also preferably, the weight-average molecular weight ($M_W$) of the polyisoprene is 55 to 100% the value of the weight-average molecular weight ($M_W$) of the polyisoprene in the plant before extraction. Also preferably, the weight-average molecular weight ($M_W$) of the extracted polyisoprene is 60 to 95% the value of the molecular weight of the polyisoprene in the plant before extraction. Also preferably, the weight-average molecular weight ($M_W$) of the extracted polyisoprene is 80 to 90% the value of the weight-average molecular weight ($M_W$) of the polyisoprene in the plant before extraction.

Therefore, the method of the invention allows the limiting or avoiding of degradation of the polyisoprene and hence limited lowering of the weight-average molecular weight ($M_W$) of the extracted polyisoprene relative to the weight-average molecular weight ($M_W$) of the polyisoprene in the plant before extraction thereof.

By selecting a particular weight-average molecular weight ($M_W$) fraction of the polyisoprene extracted according to the invention, it is possible to obtain polyisoprene having a weight-average molecular weight ($M_W$) of the selected fraction that is higher than 100% the weight-average molecular weight ($M_W$) of the polyisoprene in the plant.

Also preferably, by means of the method of the invention, the polydispersity index of the extracted polyisoprene is lower than 3, preferably lower than 2 or lower than 1.6. With the method of the invention the polydispersity index of the extracted polyisoprene may also range from 1.6 to 3 or from 1.6 to 2 or from 1.8 to 3 or from 1.8 to 3.

The method of the invention comprises an essential grinding step which may be grinding via rotary shearing using a device comprising at least one rotor and at least one stator. The grinding performed in the invention may also be grinding at a pH higher than 3 and lower than 8.

Since the method of the invention is conducted in aqueous phase, it sets itself apart from known extraction methods performed using organic solvents. In such cases, the polyisoprene is dissolved in the organic solvent at the time of extraction thereof from the plant. The aqueous phase, and in particular the water used in the method of the invention, acts as polyisoprene dispersion medium. It does not allow dissolving of polyisoprene. Preferably, grinding is performed in a volume of water or aqueous solution ranging from 3 to 7 L/kg or from 4 to 5 L/kg of plant. Also preferably, grinding is performed in a volume ranging from 3 to 7 L/kg of plant or from 4 to 5 L/kg of plant in an aqueous solution comprising an antioxidizing agent e.g. sodium sulfite or sodium bisulfite.

When grinding via rotary shearing using a device comprising at least one rotor and at least one stator, the method of the invention advantageously uses a grinder comprising a rotor and a stator, e.g. a grinder of Sylverson type particularly a Sylverson L4RT grinder, or a grinder of Fryma Koruma type, particularly a Fryma Koruma MZ 50/A grinder or Fryma Koruma ML grinder. Other types of grinder comprising a rotor and a stator allowing shearing, preferably rotary shearing may be suitable. The mechanical component of grinding according to the invention requires shearing of the plant to be treated. When implementing the method of the invention, the shear component must be in majority. When this shearing is carried out the plant is sheared, cut, shredded or chopped without excessive deformation or crushing. A flexion component may also be applied but it must not cause such excessive deformation or crushing.

For the method of the invention, when grinding at a pH higher than 3 and lower than 8, grinding can be performed by shearing alone or shearing with flexion.

Preferably, when grinding via rotary shearing using a device comprising at least one rotor and at least one stator, grinding is performed at a pH higher than 3 and lower than 11. In particularly preferred manner, grinding is performed by rotary shearing using a device comprising at least one rotor and at least one stator at a pH higher than 3 and lower than 8. A pH higher than 3 and lower than 7.8 may be suitable, as is a pH higher than 3 and lower than 7.5, or a pH higher than 3 and lower than 7, a pH higher than 4 and lower than 7.8, a pH higher than 4 and lower than 7.5, or a pH higher than 4 and lower than 7.

The method of the invention comprises the grinding of at least one plant, plant part or plant derivative into particles of size less than 1 mm. Preferably, grinding may lead to particles of size less than 500 μm. More preferably, the particles have a size of less than 250 μm, even less than 150 μm.

Also preferably, at least one step of the method of the invention is performed in the presence of at least one agent selected from among a polyisoprene extracting agent, a polyisoprene stabilising agent, a polyisoprene concentrating agent.

As polyisoprene extracting agent or polyisoprene stabilising agent, preferably use is made of a surfactant, an antioxidant or pH controlling agent.

As polyisoprene stabilising agents, particular mention can be made of sodium sulfite, sodium bisulfite, phenolic derivatives, sodium dodecyl sulfate (SDS), trimethyl tetradecylammonium bromide (TTAB), N-alkyl amino acids, 15 EO isotridecyl alcohol, acids, bases. As polyisoprene concentrating agent, preferred use is made of a creaming agent e.g., an ammonium alginate or carboxymethyl-cellulose. The creaming agent can be used in low concentration in the medium e.g. a concentration ranging from 0.05 to 0.1% by weight.

Also preferably, grinding can be performed in the presence of at least one surfactant. Numerous types of surfactants are suitable, in particular a non-ionic surfactant or ionic surfactant e.g. a cationic surfactant or zwitterionic surfactant. As examples of surfactants, mention can be made of sodium dodecyl sulfate de sodium (SDS), trimethyl tetradecylammonium bromide (TTAB), polyethylene sorbitol ester, N-alkyl amino acid.

For the method of the invention, the grinding and separating steps can be repeated at least once. The method of the invention then comprises at least these two additional steps of grinding and separation.

The method of the invention may also comprise a prior pre-treatment step of the harvested plant.

Preferably, the method of the invention allows the extraction of polyisoprene from at least one plant, plant part or plant derivative selected from among guayule (*Parthenium argentatum*), spurge (*Euphorbia lathyris*), argan (*Argania spinosa*), mariola (*Parthenium incanum*), rubber rabbitbrush (*Chrysothamnus pinifolius*), showy milkweed (*Asclepias speciosa*), pale Indian plantain (*Cacalia atripikifolia*), rubber vine (*Cryptostegia grandiflora*), Russian dandelion (*Taraxacum koksaghyz*), scorzonera (*Scorzonera* sp.), hoary mountain mint (*Pycnanthemum incanum*), Canada germander (*Teucrieum canadense*) and Tall Bellflower *Campanula americana*. In particularly preferred manner, the method of the invention is implemented to extract polyisoprene from guayule (*Parthenium argentatum*).

The method of the invention can be implemented to extract polyisoprene from a plant, part of plant or plant derivative that may optionally be previously pre-treated. Advantageously, the method of the invention can be implemented on the whole plant, on the roots or on the branches and leaves of the plant. Preferably, the method of the invention is implemented only on the branches and leaves of the plant, or only on the leaves, or only on the roots of the plant. The method of the invention can also be implemented solely on the woody biomass of the plant, or on the wood or bark of the plant. The woody biomass of the plant is generally derived from the branches of the plant from which the bark has been removed. The method of the invention may also be implemented solely on the fruit of the plant.

Preferably, for the method of the invention, grinding is performed at a temperature lower than 60° C. and more preferably at a temperature lower than 50° C. or lower than 40° C.

Before grinding, the method of the invention may comprise prior cutting of the plant into pieces of size ranging from 0.5 to 100 mm or 60 mm, preferably ranging from 0.5 to 50 mm or from 1 to 30 mm. The prior cutting of the plant into pieces is conducted in a wet medium, in an aqueous solution or in water. Preferably, prior cutting of the plant into pieces is carried out less than 6 h after harvesting the plant. More preferably, the prior cutting is performed in a wet medium in an aqueous solution or in water and the size of the cut plant pieces ranges from 0.5 to 50 mm, preferably from 1 to 30 mm, and they are stored in a wet medium in an aqueous solution or in water.

For the method of the invention grinding can be carried out fairly rapidly after harvesting the plant, in particular after harvesting guayule. For example, the harvested plant can be stored before implementing the method of the invention. The storage conditions can be adapted, in particular according to storage time before grinding or according to storage temperature. Advantageously, grinding is performed less than one week after harvesting, more preferably less than one day after harvesting, and further preferably less than 6 h after harvesting.

For the method of the invention, grinding can also be performed after soaking the plant after harvesting. Advantageously, the harvested plant can be soaked in an aqueous solution comprising at least one agent selected from among a polyisoprene extracting agent, a polyisoprene stabilising agent, a polyisoprene concentrating agent.

The method of the invention allows the extraction of polyisoprene from the plant in the form of a dispersion of polyisoprene in water. Preferably, the dispersion of polyisoprene in water comprises 5 to 65% by weight of dry polyisoprene (Dry Rubber Cont—DRC) or 10 to 65% by weight of dry rubber content. More preferably, the obtained dispersion of polyisoprene in water comprises 15 to 65% or 25 to 65% by weight of dry rubber content. Further preferably, the obtained dispersion of polyisoprene in water comprises 30 to 65% or 35 to 65% by weight of dry rubber content.

With the method of the invention it is possible to extract polyisoprene from the plant in particularly efficient manner. Advantageously, for the method of the invention the extraction yield of polyisoprene having a weight-average molecular weight ($M_W$) higher than 800 000 g/mol is greater than 50% by weight of the polyisoprene in the plant after harvesting. Preferably, the extraction yield of polyisoprene having a weight-average molecular weight ($M_W$) higher than 800 000 g/mol is greater than 60% or greater than 70% by weight of the polyisoprene in the plant after harvesting.

The method of the invention comprises grinding of the plant followed by separation of the solid residues. The separation of the solid residues can be obtained by filtration, for example using at least one sieve. A sieve of 100 µm size is suitable.

The method of the invention comprises grinding of the plant followed by separation of the solid residues. It may also comprise concentration of the polyisoprene dispersion in water. Concentration is obtained by removing water. This water removal may range from 30 to 99.9% of the volume of water, or it may be near-total removal. Advantageously, concentration can be obtained by mechanical centrifugation. It can also be obtained by mechanical centrifugation combined with creaming. It can also be obtained by mechanical centrifugation in the presence of at least one creaming agent.

In addition to concentration of the polyisoprene dispersion in water (latex), the method of the invention may also comprise stabilisation of the polyisoprene in the form of said dispersion in water.

In addition to grinding of the plant followed by separation of the solid residues, the method of the invention may also comprise coagulation of the polyisoprene and separation of the rubber. Advantageously, coagulation of the polyisoprene uses acid treatment. Preferably, coagulation of the polyisoprene is conducted in the presence of at least one antioxidizing agent.

The different aspects and advantageous properties of the invention can be illustrated by the following examples. These examples are nonlimiting in respect of the scope of this invention.

EXAMPLE 1

Extraction of Polyisoprene from Guayule Plants (*Parthenium argentatum*) Using Different Grinders Guayule plants were harvested to extract polyisoprene therefrom with the method of the invention. Harvesting comprised reaping the guayule plants two years after planting. After harvesting, the leaves and inflorescences of the guayule plants were separated. The biomass thus prepared was treated in accordance with the method of the invention. Measurements of weight-average molecular weight ($M_W$) and extraction yield were performed on the extracted polyisoprene. Comparative measurements in relation to these same variables were performed on the polyisoprene content of the plant before extraction in accordance with the method of the invention.

The extraction yield of polyisoprene (weight %) is the ratio of the weight of polyisoprene extracted, dried and coagulated with an acid, recovered after two successive extraction steps, to the weight of polyisoprene contained in the sample of biomass used for the extraction test, multiplied by 100. Each extraction test and each measured value are the mean of three tests with a standard deviation lower than 10% in relative value.

Several samples of biomass were treated. Samples were prepared from 100 g of guayule biomass mixed with 500 mL of aqueous phase. Other samples were prepared from 10 kg of guayule biomass mixed with 40 L of aqueous phase.

The different samples were treated by grinding followed by separation of the solid residues via filtration. A grinder A equipped with a rotor and stator (Silverson L4RT grinder) and a grinder B equipped with blades (Fryma Koruma MZ or ML grinder) were used. The size of the particles obtained after grinding was smaller than 150 µm. The results obtained are given in Table 1.

TABLE 1

| Test | Grinder | Weight-average molecular weight ($M_w$) of extracted polyisoprene (g/mol) | Extraction yield of polyisoprene (%) |
|---|---|---|---|
| 1 | A | 2 700 000 | 72 |
| 2 | B | 2 600 000 | 70 |
| 3 | B | 2 800 000 | 87 |

The method of the invention therefore allows the extraction of polyisoprene having a weight-average molecular weight ($M_W$) that is much higher than 1 000 000 g/mol or 1 500 000 g/mol and even higher than 2 000 000 g/mol.

EXAMPLE 2

Extraction of Polyisoprène from Guayule Plants (*Parthenium argentatum*) as a Function of pH The biomass prepared according to Example 1 was used to evaluate the influence of pH when polyisoprene is extracted with grinder A. The variation in pH from 3 to 10 was obtained by adding hydrochloric acid or ammonia to the aqueous phase when grinding. The results obtained are given in Table 2. They were obtained as a function of initial pH of the aqueous phase used for extraction.

TABLE 2

| pH | Weight-average molecular weight ($M_w$) of extracted polyisoprene (g/mol) | Extraction yield of polyisoprene (%) |
|---|---|---|
| 3 | 1 900 000 | 25 |
| 4 | 2 300 000 | 64 |
| 5 | 2 100 000 | 73 |
| 6 | 2 400 000 | 72 |
| 7 | 2 500 000 | 70 |
| 8 | 2 500 000 | 72 |
| 11 | 2 200 000 | 67 |

The method of the invention allows the extraction of polyisoprene having high weight-average molecular weight ($M_W$), including at neutral or acid pH, thereby avoiding the addition of a base.

EXAMPLE 3

Extraction of Polyisoprene from Guayule Plants (*Parthenium argentatum*) in the Presence of a Surfactant The biomass prepared according to Example 1 was used to evaluate the influence of a non-ionic surfactant (polyethylene sorbitol ester—Tween 80 product) contained in low concentration (0.01 weight %) in the aqueous phase when grinding. The results are given in Table 3.

TABLE 3

| Test | Weight-average molecular weight ($M_w$) of extracted polyisoprene (g/mol) | Extraction yield of polyisoprene (%) |
|---|---|---|
| without surfactant | 2 000 000 | 60 |
| with surfactant | 2 000 000 | 74 |

It is ascertained that the weight-average molecular weight of polyisoprene is identical to the value measured in the absence of added surfactant. However, the percent extraction of polyisoprene obtained in the presence of the non-ionic surfactant in low concentration is much higher. The presence of this surfactant therefore allows an increase in the performance level of the extraction method of the invention, without having any negative impact on the quality of the extracted polyisoprene.

What is claimed is:

1. A method for extracting polyisoprene having a weight-average molecular weight ($M_W$) higher than 800 000 g/mol, in the form of a dispersion in water, comprising:
    grinding, via rotary shearing using a device comprising at least one rotor and at least one stator or grinding at a pH higher than 3 and lower than 8, at least one plant, plant part or plant derivative selected from the group consisting of guayule (*Parthenium argentatum*), spurge (*Euphorbia lathyris*), argan (*Argania spinose*), mariola (*Parthenium incanum*), rubber rabbitbrush (*Chrysothamnus pinifolius*), showy milkweed (*Asclepias speciose*), pale Indian plantain (*Cacalia atripikifolia*), rubber vine (*Cryptostegia grandiflora*), Russian dandelion (*Taraxacum koksaghyz*), scorzonera (*Scorzonera sp.*), hoary mountain mint (*Pycnanthemum incanum*), Canada germander (*Teucrieum canadense*) and Tall Bellflower *Campanula americana* in a volume of water or in an aqueous solution ranging from 1 to 15 L/kg of plant, into particles of size less than 1 mm; and
    separating solid residues from the dispersion.

2. The method according to claim 1, wherein the grinding is performed at a pH higher than 3 and lower than 8, via shearing alone or shearing with flexion.

3. The method according to claim 1, wherein the grinding is performed at a pH higher than 3 and lower than 11, or at a pH higher than 3 and lower than 8 via rotary shearing using a device comprising at least one rotor and one stator.

4. The method according to claim 1, subsequently comprising
    concentrating the dispersion of polyisoprene in water (latex), and stabilizing the polyisoprene in the form of a dispersion in water, or
    coagulating the polyisoprene and separating the rubber.

5. The method according to claim 1, wherein grinding leads to particles of size smaller than 500 µm, or
    wherein at least one step is performed in the presence of at least one agent selected from the group consisting of a polyisoprene extracting agent, a polyisoprene stabilising agent, and a polyisoprene concentrating agent; or
    comprising at least two additional steps of grinding and separating; or
    comprising a prior pre-treatment step of the harvested plant.

6. The method according to claim 1, wherein:
    the plant is guayule (*Parthenium argentatum*); or
    the whole plant is used; or
    the plant is previously pre-treated; or
    only the roots, branches and leaves of the plant are used; or
    only the branches and leaves of the plant are used; or
    only the branches of the plant are used; or
    only the leaves of the plant are used; or
    only the roots of the plant are used; or
    only the fruit of the plant is used; or
    only the woody biomass of the plant is used; or
    only the wood of the plant is used; or
    only the bark of the plant is used.

7. The method according to claim 1, wherein the extracted polyisoprene has a weight-average molecular weight ($M_w$) higher than 1,000,000 g/mol or higher than 2,000,000 g/mol or higher than 2,500,000 g/mol.

8. The method according to claim 1, wherein the weight-average molecular weight ($M_w$) of the extracted polyisoprene is 50 to 100 of the value of the weight-average molecular weight ($M_w$) of the polyisoprene in the plant before extraction.

9. The method according to claim 1, wherein the polydispersity index of the extracted polyisoprene is lower than 3 or the polydispersity index of the extracted polyisoprene ranges from 1.6 to 3, or from 1.6 to 2, or from 1.8 to 3 or from 1.8 to 3.

10. The method according to claim 1, wherein the dispersion obtained of polyisoprene in water comprises 5 to 65 by weight of dry rubber content (DRC).

11. The method according to claim 1, wherein the extraction yield of polyisoprene having a weight-average molecular weight ($M_w$) higher than 800 000 g/mol is greater than 50 by weight of polyisoprene in the plant after harvesting.

12. The method according to claim 1, wherein the grinding is performed less than 6 months after harvesting.

13. The method according to claim 1, wherein the grinding is performed at a pH higher than 3 and lower than 7.8, or at a pH higher than 3 and lower than 7.5, or at a pH higher than 3 and lower than 7, or at a pH higher than 4 and lower than 7.8, or at a pH higher than 4 and lower than 7.5, or at a pH higher than 4 and lower than 7.

14. The method according to claim 1, wherein the grinding is performed at a temperature lower than 60° C.

15. The method according to claim 1, wherein the grinding is performed after soaking the plant after harvesting in an aqueous solution comprising at least one agent selected from the group consisting of a polyisoprene extracting agent, a polyisoprene stabilizing agent, a polyisoprene concentrating agent.

16. The method according to claim 1, wherein the separating is done by filtration.

17. The method according to claim 4, wherein the concentrating is obtained by mechanical centrifugation or by mechanical centrifugation in the presence of at least one creaming agent.

18. The method according to claim 1, wherein the grinding is conducted:
  in a volume of water or aqueous solution ranging from 3 to 7 L/kg or from 4 to 5 L/kg of plant, or
  in a volume of aqueous solution comprising an antioxidant ranging from 3 to 7 L/kg or from 4 to 5 L/kg of plant.

19. The method according to claim 1, wherein the grinding is performed in the presence of at least one surfactant selected from the group consisting of:
  an anionic surfactant;
  a cationic surfactant;
  a non-ionic surfactant; and
  a zwitterionic surfactant.

20. The method according to claim 1, also comprising:
  prior cutting of the plant in a wet medium, in an aqueous solution or in water, into pieces of size ranging from 0.5 to 100 mm or 60 mm; or
  prior cutting of the plant in a wet medium, in an aqueous solution or in water, into pieces of size ranging from 0.5 to 50 mm followed by storage of the plant pieces in a wet medium, in an aqueous solution or in water.

* * * * *